No. 893,292. PATENTED JULY 14, 1908.
G. A. WLOST.
FEEDING MECHANISM FOR TALKING MACHINES.
APPLICATION FILED DEC. 13, 1906.
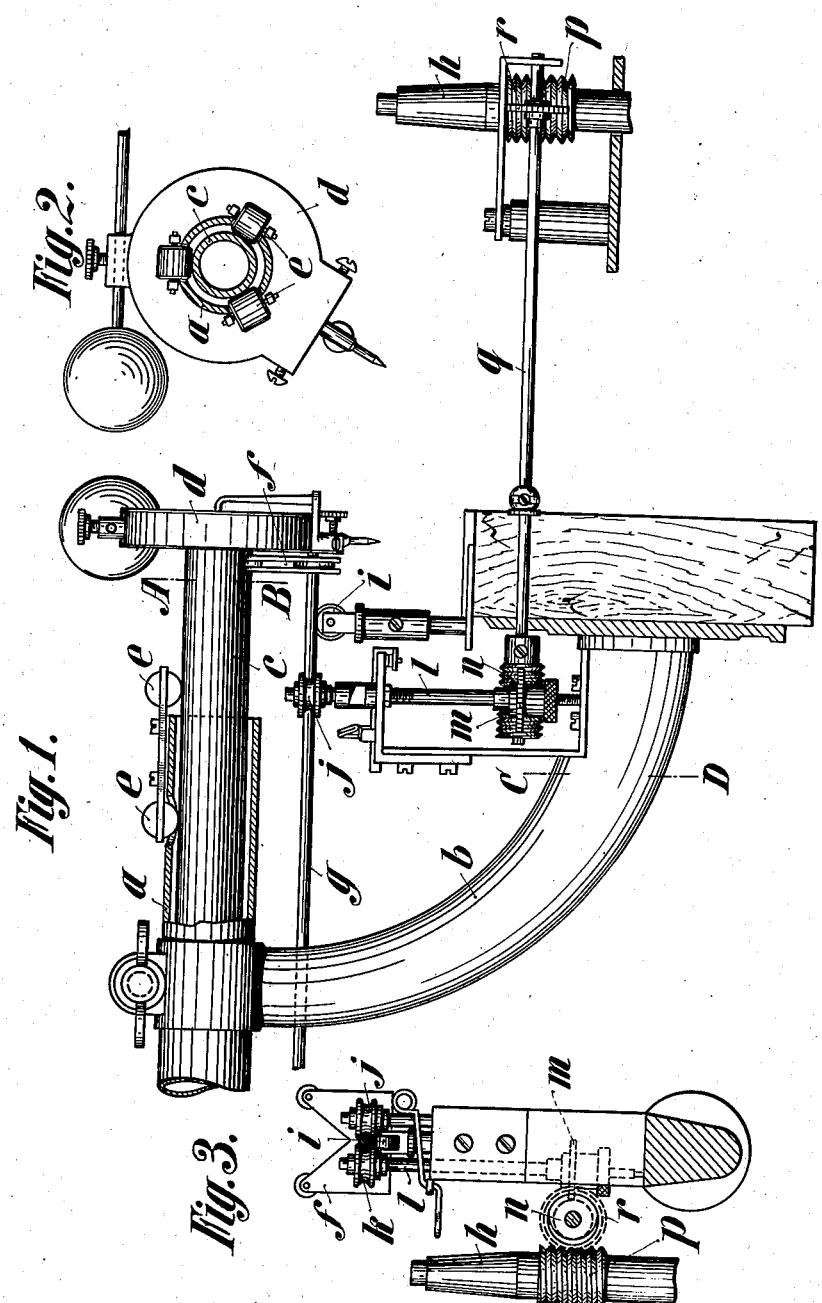
WITNESSES:
Fred White
René Bruine
INVENTOR:
Gustav Adolf Wlost
By his Attorneys

UNITED STATES PATENT OFFICE.

GUSTAV ADOLF WLOST, OF SCHRAMBERG, GERMANY, ASSIGNOR TO FIRM OF VEREINIGTE UHRENFABRIKEN VON GEBRÜDER JUNGHANS & THOMAS HALLER, A. G., OF SCHRAMBERG, GERMANY.

FEEDING MECHANISM FOR TALKING-MACHINES.

No. 893,292.            Specification of Letters Patent.            Patented July 14, 1908.

Application filed December 13, 1906. Serial No. 347,682.

*To all whom it may concern:*

Be it known that I, GUSTAV ADOLF WLOST, a subject of the King of Prussia, residing at Uhlandstrasse 13, in Schramberg, Germany, have invented certain new and useful Improvements in Feeding Mechanism for Talking-Machines, of which the following is a full, clear, and exact description.

This invention relates to feeding mechanism for talking machines wherein the diaphragm supporting tube can slide on roller guides without any articulation in a tube connected to the sounding trumpet.

In order that with such feeding mechanism the sliding or forward movement of the diaphragm tube may take place independently of the record grooves of the record disks, the diaphragm tube according to the present invention is moved forwards by means of a slide operated by the driving gear of the machine, said movement being of course always such that the feed of the diaphragm and style conforms with the spiral of record grooves on the record disk.

The accompanying drawing shows a form of construction of the present transporting device.

Figure 1 is a side elevation with partial section; Fig. 2 is a section on line A—B and Fig. 3 is a section on line C—D of Fig. 1.

The tube $a$ bearing the sounding trumpet in the usual manner is adjustably mounted in a bracket arm $b$ fastened to the box of the talking machine. In this tube $a$ extends the tube $c$ at the outer end of which is secured the part $d$ supporting the diaphragm. The tube $c$ slides on rollers $e$ extending on the one hand through recesses of the tube $a$ and bearing on the other hand on the tube $c$ outside the tube $a$. The tube $c$ bears on its diaphragm supporting end upon a slide which, as shown, comprises the bracket $f$ provided with rollers or rotary disks and the guide bar $g$. The latter moves within the bracket arm $b$ and is supported in its forward part by a roller $i$. It moves between two friction rollers $j$ and $k$, the latter of which is arranged on a readily interchangeable shaft $l$. There is mounted on this shaft a removable worm wheel $m$ engaging in a worm $n$ set in rotation from the driving gear of the machine. The driving motion of the worm may be derived from the driving gear in such a manner that the spindle $h$ receiving the record disk is likewise provided with a worm $p$ where in the correspondingly lengthened shaft $a$ of the worm $n$ engages by means of the worm wheel $r$. The gear is proportioned in such a manner that the feed of the slide and diaphragm supporting tube $c$ conforms with the actual spiral of record grooves of the record disk. As these grooves in the various manufactured types of disks are sometimes close together and sometimes wide apart, shaft $l$ and worm wheel $m$ have been made readily interchangeable in such a manner that the feed of the diaphragm may be readily adapted to the actual type of disk by mounting a suitable worm wheel thereon.

What I claim as my invention, and desire to secure by Patent is:

In a talking machine, the combination of a diaphragm, and means for moving said diaphragm including friction rollers and means for driving said friction rollers including worm gearing having an intermediate shaft $l$ and worm wheel $m$, and means for mounting such shaft and wheel so that they may be easily removed.

In witness whereof, I have hereunto signed my name in the presence of two subscribing witnesses.

GUSTAV ADOLF WLOST.

Witnesses:
     ERNST ENTENMANN,
     WM. HAHN.